(12) United States Patent
Shahidi et al.

(10) Patent No.: US 9,630,567 B1
(45) Date of Patent: Apr. 25, 2017

(54) PACKAGE TRAY ASSEMBLY OF A VEHICLE

(71) Applicant: Ford Global Technologies, LLC, Dearborn, MI (US)

(72) Inventors: Behrooz Shahidi, Novi, MI (US); Tofiqul Islam, Rochester Hills, MI (US); Madhusudhan Deme, Novi, MI (US); Rezaul Choudhury, Sterling Heights, MI (US); Wilson T. Ang, Inkster, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/093,197

(22) Filed: Apr. 7, 2016

(51) Int. Cl.
*B60R 11/00* (2006.01)
*B60R 11/02* (2006.01)
*B60J 3/00* (2006.01)
*B60R 22/34* (2006.01)

(52) U.S. Cl.
CPC ............. *B60R 11/0217* (2013.01); *B60J 3/00* (2013.01); *B60R 22/34* (2013.01)

(58) Field of Classification Search
CPC ............ B60R 5/044; B60R 7/08; B62D 25/08
See application file for complete search history.

(56) References Cited

U.S. PATENT DOCUMENTS

| | | | | |
|---|---|---|---|---|
| 5,123,696 A | * | 6/1992 | Watari | B62D 25/088 296/201 |
| 5,350,214 A | * | 9/1994 | Yamauchi | B62D 25/088 296/198 |
| 7,325,865 B2 | | 2/2008 | Yamazaki | |
| 7,328,928 B2 | * | 2/2008 | Aizawa | B62D 25/087 296/24.4 |
| 7,410,208 B2 | * | 8/2008 | Kim | B60R 11/0217 296/193.08 |
| 8,184,847 B2 | * | 5/2012 | Bertoli | H04R 1/025 296/186.3 |
| 8,511,731 B2 | * | 8/2013 | Sakai | B62D 25/02 296/193.02 |
| 9,248,781 B2 | | 2/2016 | Oppliger | |

(Continued)

FOREIGN PATENT DOCUMENTS

| FR | EP 0926007 A1 | * | 6/1999 |
|---|---|---|---|
| FR | 2779403 | * | 12/1999 |

(Continued)

*Primary Examiner* — Dennis H Pedder
(74) *Attorney, Agent, or Firm* — Jason C. Rogers; Brooks Kushman P.C.

(57) ABSTRACT

A package tray assembly of a vehicle includes a package tray panel and a Z-member. The package tray panel may be located adjacent a rear window cutout and defines a speaker cutout in a substantially central region of the panel, a first edge, and a second edge. The Z-member may be mounted to the panel adjacent the speaker cutout and spans across the panel from the first edge to the second edge, or from substantially the first edge to the second edge, to structurally reinforce the package tray panel and reduce vibration therein. The Z-member may be mounted to an under surface of the package tray panel and proximate a sunshade to reduce vibration within the sunshade resulting from activation of a speaker at least partially extending through the speaker cutout.

18 Claims, 6 Drawing Sheets

(56) References Cited

U.S. PATENT DOCUMENTS

| | | | | |
|---|---|---|---|---|
| 2006/0119140 A1* | 6/2006 | Yamazaki | ............... | B62D 25/08 296/203.04 |
| 2008/0279412 A1* | 11/2008 | Bertoli | ................... | H04R 1/025 381/389 |
| 2014/0158567 A1* | 6/2014 | Park | ....................... | B62D 25/02 206/335 |
| 2015/0256912 A1* | 9/2015 | Nedelman | ........... | B60R 11/0217 381/389 |

FOREIGN PATENT DOCUMENTS

| | | | | |
|---|---|---|---|---|
| JP | 2004262329 | A | * | 9/2004 |
| KR | 20040016256 | A | * | 2/2004 |
| KR | 20050099361 | A | | 10/2005 |
| KR | 101406403 | B1 | | 6/2010 |

* cited by examiner

PACKAGE TRAY ASSEMBLY OF A VEHICLE

TECHNICAL FIELD

This disclosure relates to a package tray panel assembly of a vehicle.

BACKGROUND

Automotive manufacturers consistently strive to improve vibration characteristics of vehicle component assemblies and loudness or rattles associated therewith. Increasing customer demand for higher audio system output may increase vibration issues of the vehicle component assemblies adjacent and proximate thereto. Damping structures may assist in reducing these vibration issues.

SUMMARY

A package tray assembly of a vehicle includes a package tray panel and a Z-member. The package tray panel is located adjacent a rear window cutout and defines a speaker cutout in a substantially central region of the panel, a first edge, and a second edge. The Z-member is mounted to the panel adjacent the speaker cutout and spans across the panel from the first edge to the second edge to structurally reinforce the package tray panel and reduce vibration therein. The Z-member may be mounted to an under surface of the package tray panel and proximate a sunshade to reduce vibration within the sunshade resulting from activation of a speaker at least partially extending through the speaker cutout. The Z-member may be arranged with a sunshade mounted to the package tray to dampen an interaction between the speaker and sunshade due to operation of the speaker. A seat belt retractor may be mounted to one of a vehicle frame or the package tray panel and arranged with the Z-member to reduce vibration affecting a belt-lock of the seat belt retractor due to operation of a speaker at least partially extending through the speaker cutout. The Z-member may be tapered at a central portion thereof to provide space between an edge of the speaker cutout and the Z-member. The Z-member may further include a plurality of mounting features dispersed along a length of the Z-member and oriented thereon for securing to the package tray panel to an under surface of the package tray panel. The package tray panel may further define a pair of rear cutouts, and the Z-member may be mounted to the package tray panel between the speaker cutout and the rear cutouts.

A package tray assembly of a vehicle includes a package tray, a sunshade, and a Z-member. The package tray panel is mounted to a vehicle frame and defines a first lateral edge, a second lateral edge, and a speaker cutout disposed between the edges at a substantially central region of the package tray panel. The sunshade is secured to an upper surface of the package tray panel adjacent the speaker cutout. The Z-member is secured to an under surface of the package tray panel adjacent the speaker cutout and proximate the sunshade to structurally reinforce the assembly and to reduce vibration in the sunshade resulting from operation of a speaker at least partially extending through the speaker cutout. The Z-member may span from the first lateral edge to the second lateral edge. The Z-member may include two ends, and one of each of the ends may be spaced from the first edge or the second edge. The Z-member may define a tiered structure having a first portion transitioning to a second portion in a step-like manner. The second portion may be sized to provide clearance for a surface feature defined by the package tray panel. The package tray panel may be disposed between two C-pillars of the vehicle. The package tray panel may further define two rear cutouts located rearward of the speaker cutout, and the Z-member may be disposed between the cutouts. The Z-member and sunshade may be arranged with one another such that a vibration output within the sunshade and due to speaker operation is within a predetermined range.

A package tray assembly of a vehicle includes a package tray panel, a seat belt retractor, and a structural reinforcement member. The package tray panel defines a speaker cutout and is mounted to a vehicle frame adjacent a vehicle frame rear window cutout. The seat belt retractor is mounted to the vehicle frame adjacent the package tray panel. The structural reinforcement member extends along an under surface of the package tray panel adjacent the speaker cutout and is arranged with the seat belt retractor to reduce vibration therein as a result of operation of a speaker at least partially extending through the speaker cutout. The package tray further may define a first edge, a second edge, and a pair of rear cutouts. The structural reinforcement may be disposed between the edges and the cutouts. The seat belt retractor may include a belt-lock mechanism arranged to engage with a belt, and the structural reinforcement member and the seat belt retractor may be arranged such that vibration generated by the operation of the speaker does not drive engagement of the belt lock mechanism and belt. The structural reinforcement may define a two tiered structure having a first portion transitioning to a second portion in a step-like manner. The second portion may be sized to provide clearance for a surface feature defined by the package tray panel. The package tray panel may be disposed between two C-pillar regions of the vehicle. A sunshade may be mounted to an upper surface of the package tray panel proximate the structural reinforcement member and such that ends of the sunshade extend over portions of the vehicle frame.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ embodiments of the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
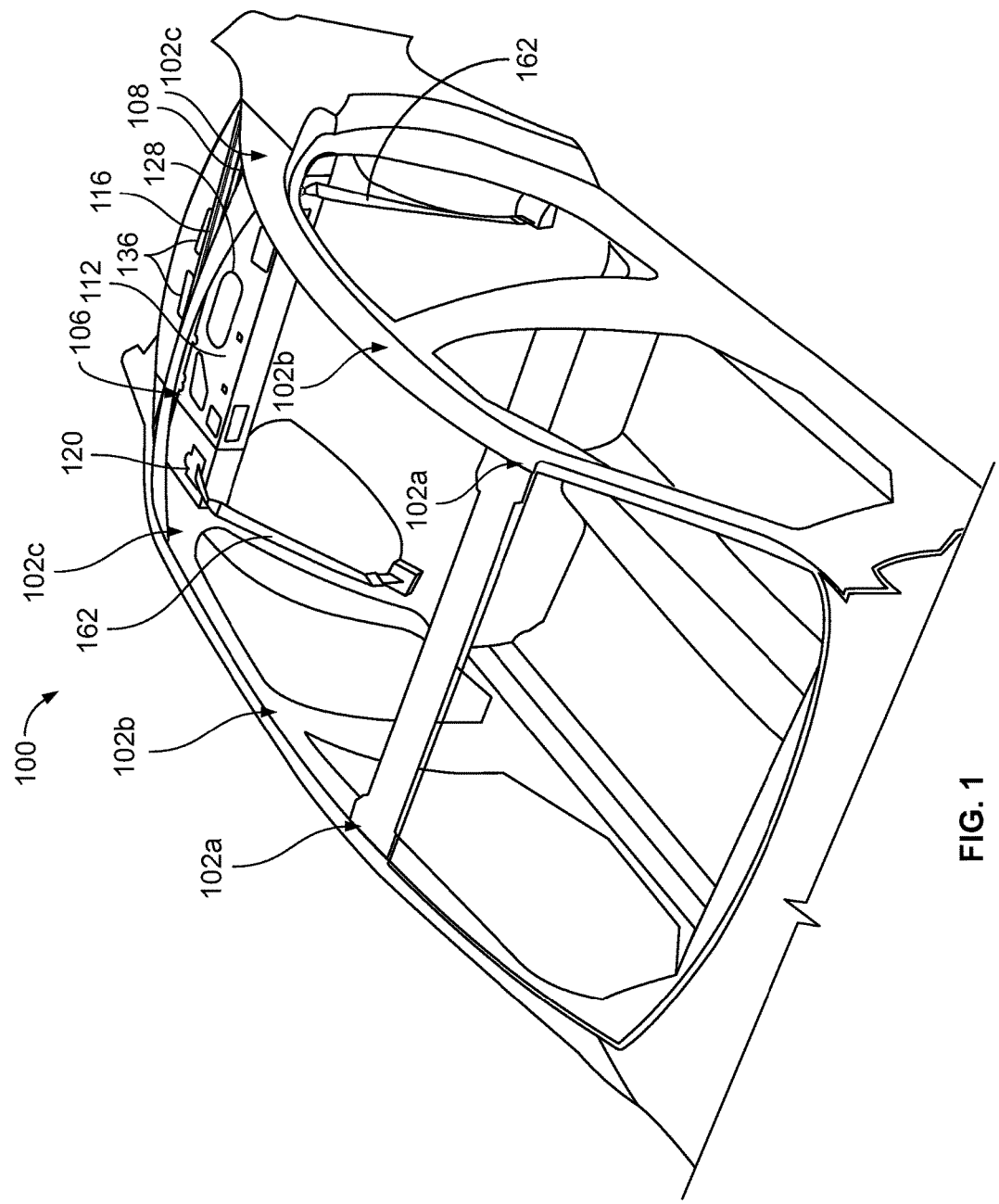
FIG. 1 is a perspective view of an example of a vehicle frame.
Figure 2:
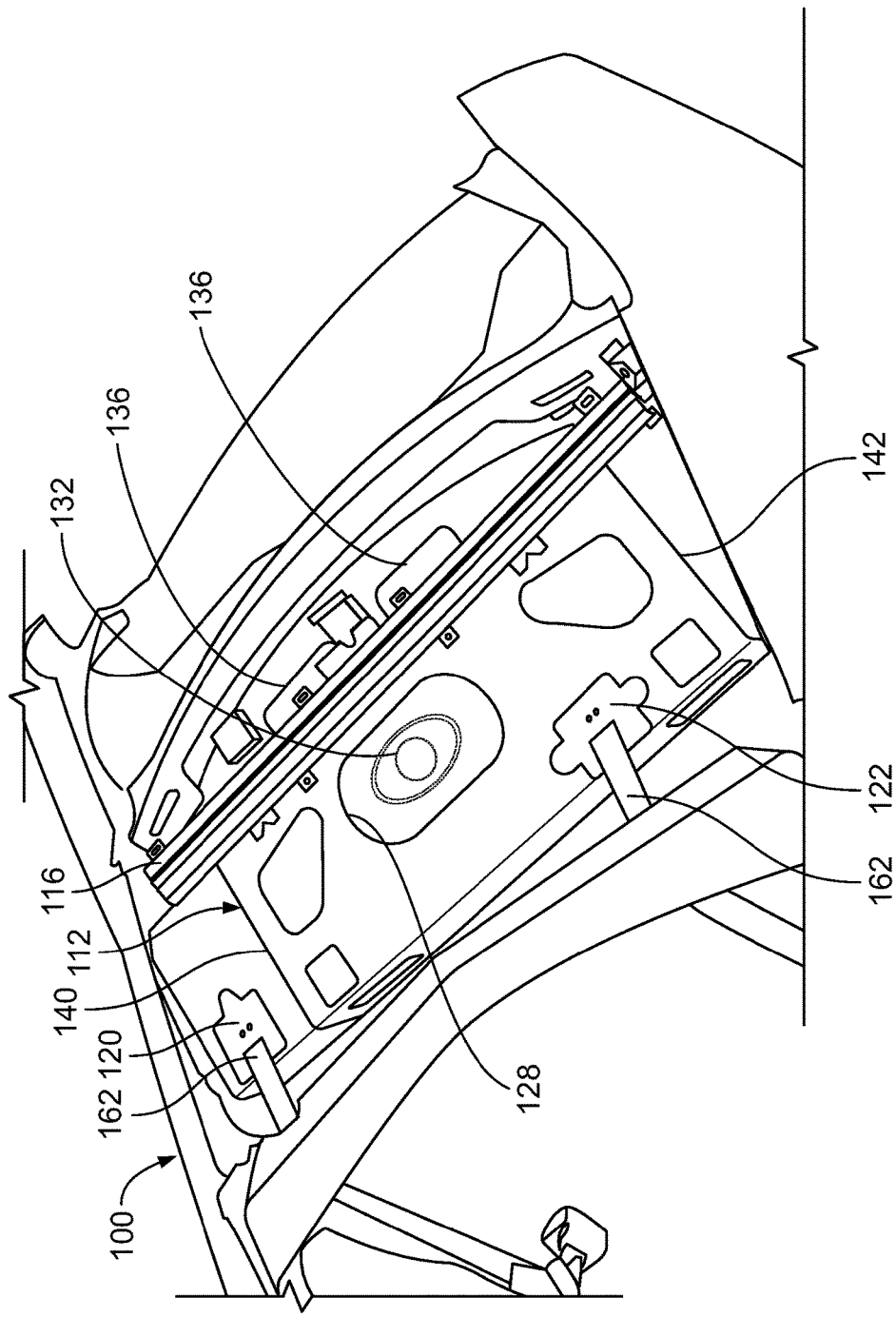
FIG. 2 is a detailed perspective view of a portion of the vehicle frame of FIG. 1.

FIGS. 1 and 2 show an example of a vehicle frame, referred to generally as a vehicle frame 100. The vehicle frame 100 may include A-pillar regions 102a, B-pillar regions 102b, and C-pillar regions 102c. Various vehicle components may be mounted to the vehicle frame 100. For example, a package tray assembly 106 may be mounted to a rearward portion of the vehicle frame 100 disposed between the C-pillar regions 102c. The rearward portion of the vehicle frame 100 may include a region adjacent to a rear window cutout 108 sized to receive a rear windshield (not shown). The package tray assembly 106 may include a package tray panel 112, a Z-member 114, and a sunshade 116 as further shown in FIG. 3. A first seat belt retractor 120 and a second seat belt retractor 122 may be mounted to the vehicle frame 100. Alternatively, the first seat belt retractor 120 or the second seat belt retractor 122 may be mounted to the package tray panel 112.

Figure 4:
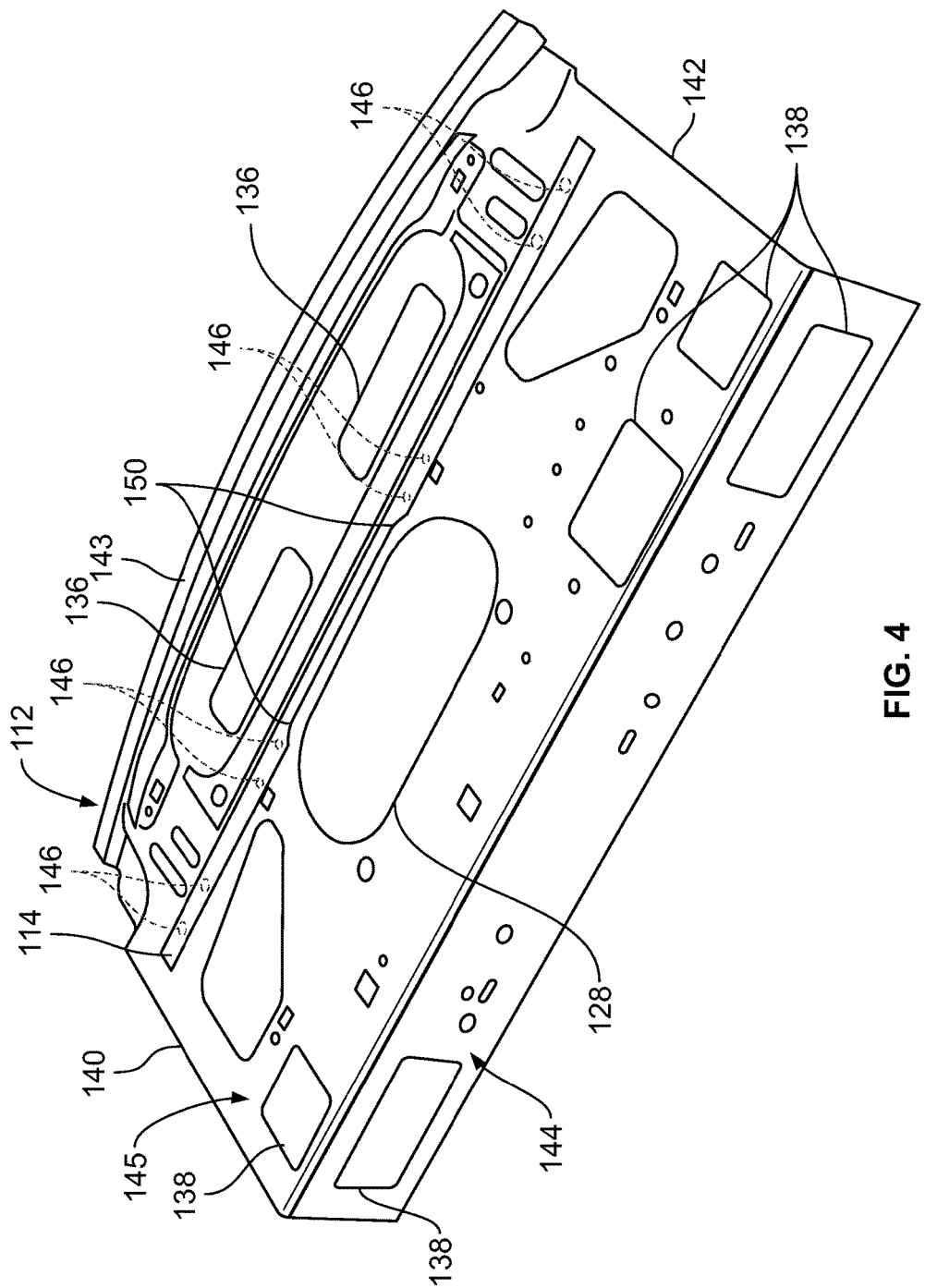
FIG. 4 is a perspective underside view of an example of a portion of the package tray panel assembly of FIG. 3.

The package tray panel 112 may define various cutouts sized for vehicle components as further shown in FIG. 4. For example, a speaker cutout 128 may be defined by the package tray panel 112 and located at a substantially central region thereof. The speaker cutout 128 may be sized for a portion of a speaker, such as a speaker 132, to extend therethrough. The package tray panel 112 may further define a pair of rear cutouts 136, seat belt cutouts 138, a first edge 140, and a second edge 142. The package tray panel 112 may define a rear edge 143. The rear edge 143 may be sized for location adjacent the rear window cutout 108. The package tray panel 112 may include a vertical portion 144 extending from a horizontal portion 145 at substantially ninety degrees relative to the horizontal portion 145. The vertical portion 144 and the horizontal portion 145 may define an L-shaped profile.

The Z-member 114 may be mounted to the package tray panel 112 and disposed between the speaker cutout 128 and the rear cutouts 136. The Z-member 114 may operate as a structural reinforcement to the package tray panel 112 and surrounding region. For example, the Z-member 114 may be secured to the package tray panel 112 via a plurality of mounting features 146 dispersed along a length of the Z-member 114. Examples of suitable mounting features for the plurality of mounting features 146 include space to facilitate welding or an application of an adhesive. The Z-member 114 may be mounted to an under surface of the package tray panel 112. The Z-member 114 may span across the package tray panel 112 from the first edge 140 to the second edge 142. Alternatively, the Z-member 114 may span substantially across the package tray panel 112 as shown in FIG. 4 and such that ends of the Z-member 114 are spaced from the first edge 140 and the second edge 142.

Figure 3:
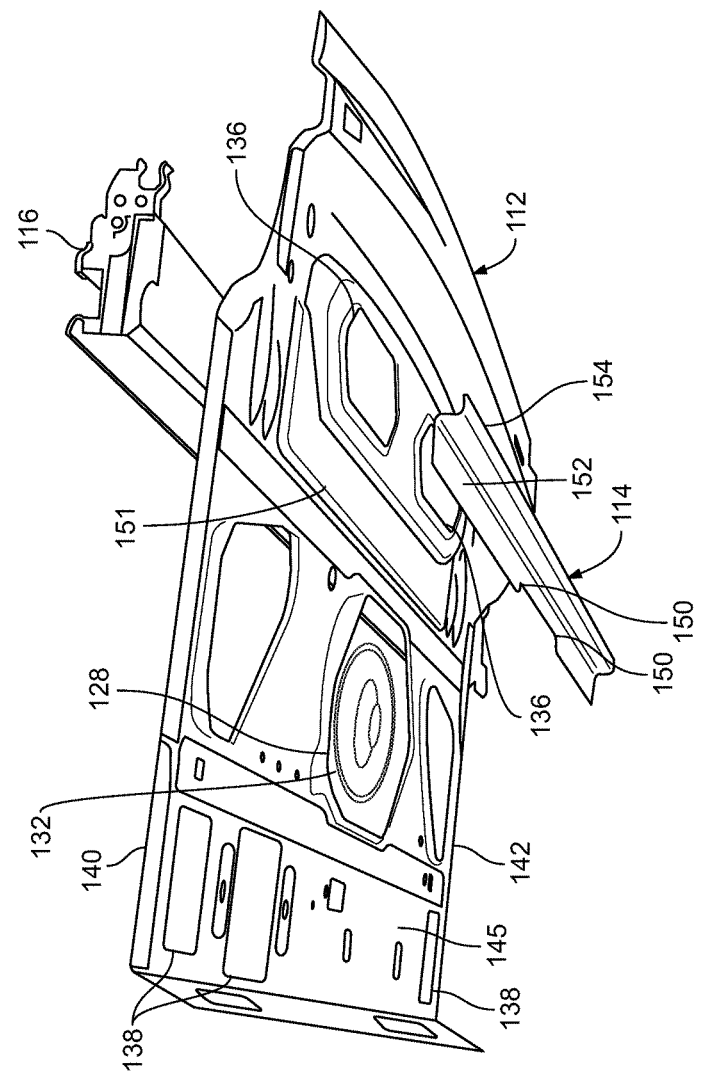
FIG. 3 is an exploded perspective view of an example of a portion of a package tray panel assembly.

The Z-member 114 may define a tapered central portion 150. The tapered central portion 150 may be sized to accommodate a portion of the speaker cutout 128. The Z-member 114 may be multi-tiered to accommodate surface extrusions or features of the package tray panel 112. For example, FIG. 3 is an exploded view of the package tray assembly 106 showing a surface feature 151 defined by the package tray panel 112 and located adjacent a mounting location for the Z-member 114. The Z-member 114 may include a first portion 152 transitioning to a second portion 154 in a step-like manner. As such, the second portion 154 may be offset from the package tray panel 112 to provide space for the surface feature 151. Inclusion of the Z-member 114 as part of the package tray assembly 106 may also assist in facilitating use of a package tray panel having less weight in comparison to a heavier structure needed to provide adequate stiffness characteristics for a package tray panel without a reinforcement member.

Figure 5:
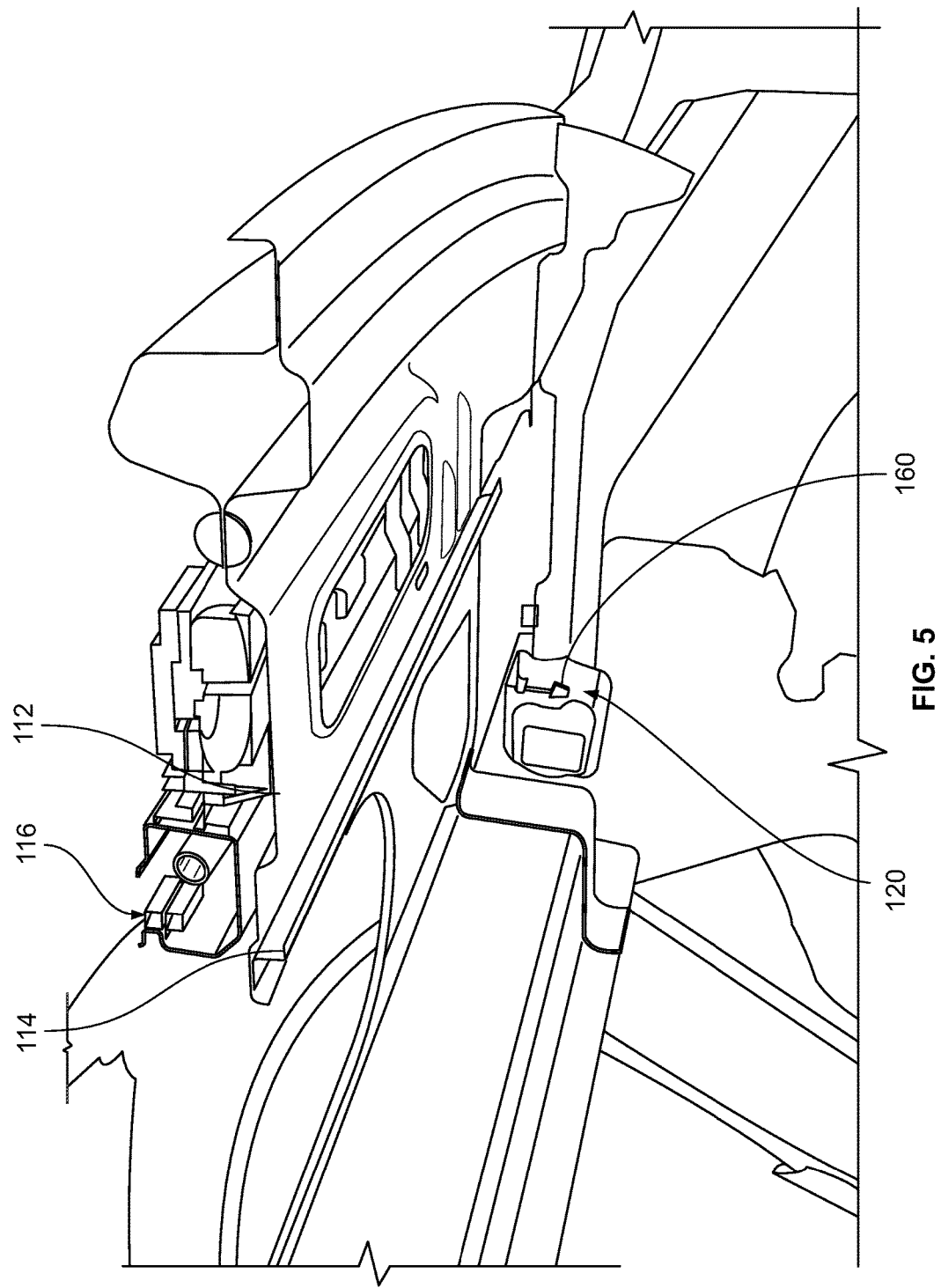
FIG. 5 is a perspective view, in cross-section, of a portion of the package tray panel assembly of FIG. 3.

The sunshade 116 may be mounted to the package tray panel 112 and may also be partially mounted to the vehicle frame 100. The sunshade 116 may include internal components relating to operation thereof. These internal components and the sunshade 116 may incur vibrations during operation of, for example, the speaker 132. The sunshade 116 may be oriented proximate the Z-member 114. For example, FIG. 5 shows an example of an orientation for the sunshade 116 relative to the Z-member 114.

The package tray assembly 106 may assist in reducing vibration occurring within the sunshade 116 and the seat belt retractors due to operation of a speaker, such as the speaker 132. For example, location of the Z-member 114 proximate the sunshade 116 may provide additional structural reinforcement to a surrounding region to assist in reducing the vibrations occurring within the sunshade 116.

As another example, the package tray assembly 106 may assist in reducing vibrations within the seat belt retractors as a result of, for example, operation of the speaker 132. The first seat belt retractor 120 and the second seat belt retractor 122 may include a belt lock mechanism 160 as shown in FIG. 5. The belt lock mechanism 160 may be arranged with a belt 162 for engagement under certain conditions. For example, the belt lock mechanism 160 may engage the belt 162 to prevent extension or retraction of the belt 162. Vibrations proximate to or within the first seat belt retractor 120 may cause the belt lock mechanism 160 to engage the belt 162 outside of certain acceptable conditions. The Z-member 114 may assist in reducing the vibrations proximate to or within the seat belt retractors that may cause the undesirable engagement of the belt lock mechanisms 160 and the belt 162 by structurally reinforcing a region including the package tray assembly 106.

Figure 6:
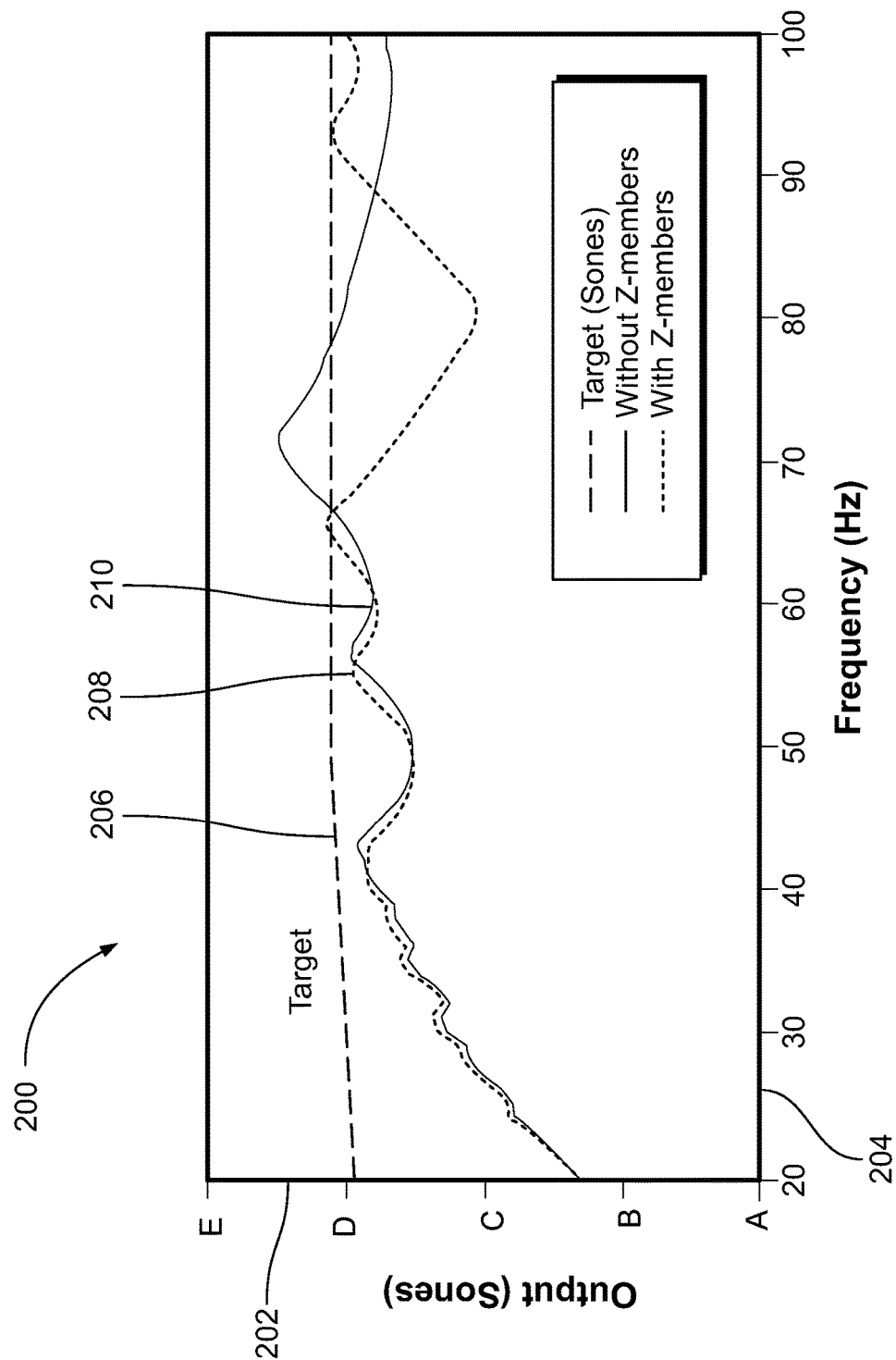
FIG. 6 is a graph depicting a comparison of rattle loudness of two examples of package tray panel assemblies.

FIG. 6 shows an example of a graph 200 illustrating a vibration comparison in sones relative to the package tray assembly 106 including the Z-member 114 and a package tray assembly without a component similar to the Z-member 114. A sone may be described as a unit representing how loud a sound is perceived. In this example, the sound is derived from vibrations during operation of a speaker. For example, the vibrations may occur within a sunshade of the package tray assembly 106 or within one of the seat belt retractors located proximate the speaker. In FIG. 6, a Y-axis 202 represents a vibrational output in sones and a X-axis 204 represents a frequency in hertz (Hz) of an output of a speaker, such as the speaker 132, proximate a package tray panel assembly, such as the package tray assembly 106. The Y-axis 202 lists values of A, B, C, D, and E which may be considered sone output values. For example, the D value may be approximately equal to a target plot 206.

In this example, a region at and below plot 206 represents a predetermined acceptable level of vibration output of a package tray panel assembly in sones. Plot 208 represents a vibration output for a package tray panel assembly including a Z-member, such as the package tray assembly 106 including the Z-member 114. Plot 210 represents a vibration output for a package tray panel assembly without a component similar to the Z-member 114. The graph 200 shows the plot 210 rising above the plot 206 between approximately 67 Hz and 79 Hz, at a delta of approximately 30 sones. However, the plot 208 stays below the plot 206 in a region of the predetermined acceptable level of vibration output. As such, the graph 200 shows that an environment including a package tray assembly including a Z-member incurs a lower vibrational effect due to operation of a speaker in comparison to the environment including a package tray assembly without a Z-member.

While various embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to marketability, appearance, consistency, robustness, customer acceptability, reliability, accuracy, etc. As such, embodiments described as less desirable than other embodiments or prior art implementations with respect to one or more characteristics are not outside the scope of the disclosure and can be desirable for particular applications.

What is claimed is:

1. A vehicle package tray assembly comprising:
   a package tray panel adjacent a rear window cutout and defining a speaker cutout in a substantially central region of the panel and first and second edges; and
   a hanging Z-member having three sides only, mounted to the panel adjacent the speaker cutout, extending rearwardly from the cutout, and spanning across the panel from the first edge to the second edge to structurally reinforce the panel and reduce vibration.

2. The assembly of claim 1 further comprising a speaker at least partially extending through the speaker cutout, wherein the Z-member is arranged with a sunshade mounted to the package tray to dampen an interaction between the speaker and sunshade due to operation of the speaker.

3. The assembly of claim 1 further comprising a seat belt retractor mounted to one of a vehicle frame or the package tray panel and arranged with the Z-member to reduce vibration affecting a belt-lock of the seat belt retractor due to operation of a speaker at least partially extending through the speaker cutout.

4. The assembly of claim 1, wherein the Z-member is notched at a central portion thereof to provide space between an edge of the speaker cutout and the Z-member.

5. The assembly of claim 1, wherein the Z-member further comprises a plurality of mounting features dispersed along a length of the Z-member and oriented thereon for securing to the package tray panel to an under surface of the package tray panel.

6. The assembly of claim 1, wherein the package tray panel further defines a pair of rear cutouts, and wherein the Z-member is mounted to the package tray panel between the speaker cutout and the rear cutouts.

7. A vehicle package tray assembly comprising:
   a package tray panel mounted to a vehicle frame and defining a first lateral edge, a second lateral edge, and a speaker cutout disposed between the edges at a substantially central region of the package tray panel;
   a sunshade secured to an upper surface of the package tray panel adjacent the speaker cutout; and
   a hanging Z-member having three sides only and secured to an under surface of the package tray panel adjacent the speaker cutout, extending rearwardly from the cutout, and proximate the sunshade to structurally reinforce the assembly and to reduce vibration in the sunshade resulting from operation of a speaker at least partially extending through the speaker cutout.

8. The assembly of claim 7, wherein the Z-member spans from the first lateral edge to the second lateral edge.

9. The assembly of claim 7, wherein the Z-member includes two ends, and wherein one of each of the ends is spaced from the first edge or the second edge.

10. The assembly of claim 7, wherein the Z-member defines a tiered structure having a first portion transitioning to a second portion in a step-like manner, and wherein the second portion is sized to provide clearance for a surface feature defined by the package tray panel.

11. The assembly of claim 7, wherein the package tray panel is disposed between two C-pillars of the vehicle.

12. The assembly of claim 7, wherein the package tray panel further defines two rear cutouts located rearward of the speaker cutout, and wherein the Z-member is disposed between the cutouts.

13. The assembly of claim 7, wherein the Z-member and sunshade are arranged with one another such that a vibration output within the sunshade and due to speaker operation is within a predetermined range.

14. A vehicle package tray assembly comprising:
   a package tray panel defining a speaker cutout and mounted to a vehicle frame adjacent a vehicle frame rear window cutout;
   a seat belt retractor mounted to the vehicle frame adjacent the package tray panel; and
   a hanging Z-shaped structural reinforcement member having three sides only and extending along an under surface of the package tray panel adjacent the speaker cutout, extending rearwardly from the cutout, and arranged with the seat belt retractor to reduce vibration therein as a result of operation of a speaker at least partially extending through the speaker cutout.

15. The assembly of claim 14, wherein the package tray further defines a first edge, a second edge, and a pair of rear cutouts, and wherein the structural reinforcement member is disposed between the edges and the cutouts.

16. The assembly of claim 14, wherein the seat belt retractor includes a belt-lock mechanism arranged to engage with a belt, and wherein the structural reinforcement member and the seat belt retractor are arranged such that vibration generated by the operation of the speaker does not drive engagement of the belt lock mechanism and belt.

17. The assembly of claim 14, wherein the structural reinforcement member defines a two tiered structure having a first portion transitioning to a second portion in a step-like manner, and wherein the second portion is sized to provide clearance for a surface feature defined by the package tray panel.

18. The assembly of claim 14, wherein the package tray panel is disposed between two C-pillar regions of the vehicle.

* * * * *